US008570407B2

(12) United States Patent
Muramatsu

(10) Patent No.: US 8,570,407 B2
(45) Date of Patent: Oct. 29, 2013

(54) IMAGING APPARATUS, IMAGE PROCESSING PROGRAM, IMAGE PROCESSING APPARATUS, AND IMAGE PROCESSING METHOD

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 127 days.

(21) Appl. No.: 12/993,027

(22) PCT Filed: Jun. 16, 2009

(86) PCT No.: PCT/JP2009/002736
§ 371 (c)(1),
(2), (4) Date: Nov. 16, 2010

(87) PCT Pub. No.: WO2010/007726
PCT Pub. Date: Jan. 21, 2010

(65) Prior Publication Data
US 2011/0128404 A1    Jun. 2, 2011

(30) Foreign Application Priority Data

Jul. 17, 2008  (JP) ................................. 2008-186091
Jul. 29, 2008  (JP) ................................. 2008-194851

(51) Int. Cl.
*H04N 5/202*    (2006.01)
(52) U.S. Cl.
USPC ............................. 348/254; 382/274; 358/521
(58) Field of Classification Search
USPC ................. 348/222.1, 254; 382/274; 358/521
See application file for complete search history.

(56) References Cited

U.S. PATENT DOCUMENTS

| 5,454,044 A | 9/1995 | Nakajima |
| 8,103,119 B2 * | 1/2012 | Kuniba ......................... 382/274 |
| 2001/0007599 A1 * | 7/2001 | Iguchi et al. .................. 382/274 |
| 2007/0081721 A1 * | 4/2007 | Xiao et al. .................... 382/167 |

(Continued)

FOREIGN PATENT DOCUMENTS

| JP | B2-2663189 | 10/1997 |
| JP | A-2005-215543 | 8/2005 |

(Continued)

OTHER PUBLICATIONS

International Search Report issued in Application No. PCT/JP2009/002736; Dated Oct. 6, 2009.
International Preliminary Report on Patentability issued in Application No. PCT/JP2009/002736; Dated Feb. 8, 2011 (With Translation).

(Continued)

*Primary Examiner* — Tuan Ho
*Assistant Examiner* — Fayez Bhuiyan
(74) *Attorney, Agent, or Firm* — Oliff & Berridge, PLC

(57) ABSTRACT

Image processing capable of improving bright and dark part gradation is performed while maintaining apparent contrast by providing an imaging unit generating image data, a selecting unit selecting either a first mode not performing a correction on a dark part gradation of the image data or a second mode performing the correction, a gradation conversion processing unit performing gradation conversion processing according to a first characteristic when the first mode is selected and performing the gradation conversion processing according to a second characteristic which includes a characteristic achieving, for a same input level, an output level lower than the first characteristic and includes a characteristic changing contrast when the second mode is selected, and a correcting unit performing the correction to improve a lightness in the dark part gradation of the image data according to the second characteristic by the gradation conversion processing unit when the second mode is selected.

18 Claims, 15 Drawing Sheets

(56) References Cited

U.S. PATENT DOCUMENTS

| | | | |
|---|---|---|---|
| 2008/0002216 A1* | 1/2008 | Matsushima | 358/1.9 |
| 2008/0253650 A1* | 10/2008 | Kuniba | 382/167 |
| 2008/0297632 A1 | 12/2008 | Muramatsu | |
| 2009/0040338 A1 | 2/2009 | Muramatsu | |
| 2010/0020341 A1* | 1/2010 | Enjuji | 358/1.9 |

FOREIGN PATENT DOCUMENTS

| | | |
|---|---|---|
| JP | A-2007-067907 | 3/2007 |
| JP | A-2008-288706 | 11/2008 |
| JP | A-2008-301371 | 12/2008 |
| JP | A-2009-044221 | 2/2009 |

* cited by examiner

IMAGING APPARATUS, IMAGE PROCESSING PROGRAM, IMAGE PROCESSING APPARATUS, AND IMAGE PROCESSING METHOD

CROSS REFERENCE TO RELATED APPLICATION

This application is a U.S. National Stage Application claiming the benefit of prior filed International Application Number PCT/JP2009/002736, filed on Jun. 16, 2009, in which the International Application claims priorities from Japanese Patent Application Numbers 2008-186091 (filed on Jul. 17, 2008) and 2008-194581 (filed Jul. 29, 2008), the entire contents of which are incorporated herein by reference.

TECHNICAL FIELD

The present invention relates to an imaging apparatus, an image processing program, an image processing apparatus, and an image processing method.

BACKGROUND ART

Conventionally, there has been known a phenomenon that gradation in a dark part of image data is flattened darkly when an object having a large brightness difference is photographed. Accordingly, the invention of Patent Document 1 compresses a gradation by increasing a gain in the dark part gradation to improve the dark flattening of the dark part gradation.
Patent Document 1: Japanese Patent No. 2663189

DISCLOSURE

Problems to be Solved

Meanwhile, as for gradation conversion processing, there is widely known the gradation conversion processing using a so-called S-shaped gradation curve for enhancing contrast. The gradation conversion processing using this S-shaped gradation curve, although capable of enhancing the contrast, sometimes degrades contrast in bright part gradation or flattens the dark part gradation darkly.

The present invention has been made in view of the above-described problems and a proposition of the present invention is to perform image processing capable of improving the bright part gradation and the dark part gradation while maintaining the apparent contrast.

Means for Solving the Problem

An imaging apparatus of the present invention including an imaging unit capturing an object image and generating image data, a selecting unit selecting either a first photographing mode not performing a correction on a dark part gradation of the image data or a second photographing mode performing the correction on the dark part gradation of the image data, a gradation conversion processing unit performing gradation conversion processing according to a first input-output characteristic when the first photographing mode is selected and performing the gradation conversion processing according to a second input-output characteristic which includes a characteristic achieving, for a same input level, an output level lower than the first input-output characteristic and includes a characteristic changing a contrast when the second photographing mode is selected, and a correcting unit performing the correction to improve a lightness in the dark part gradation of the image data to which the gradation conversion processing is performed according to the second input-output characteristic by the gradation conversion processing unit when the second photographing mode is selected.

Note that, the characteristic changing the contrast in the second input-output characteristic may include a characteristic reducing the contrast in a middle part of a gradation.

In addition, the second input-output characteristic may be defined either by a gradation curve having the characteristic achieving, for the same input level, a lower output level than the first input-output characteristic and a gradation curve having the characteristic changing the contrast, or by a single gradation curve which has the characteristic achieving, for the same input level, a lower output level than the first input-output characteristic and the characteristic changing the contrast.

Further, the imaging apparatus of the present invention may include a decision unit deciding a lightness improvement amount in the dark part gradation by the correcting unit according to the second input-output characteristic, and the correcting unit may correct the dark part gradation of the image data according to the lightness improvement amount.

In addition, the decision unit may obtain an adjustment degree of a local contrast representing a contrast in a local region of an image according to the characteristic changing the contrast in the second input-output characteristic, and may decide the lightness improvement amount according to the adjustment degree being obtained.

An image processing program of the present invention realizing image processing on image data to be processed by a computer, which the program realizes an obtaining step obtaining the image data, a decision step deciding an input-output characteristic to be used for gradation conversion processing, a gradation conversion processing step performing the gradation conversion processing on the image data according to the input-output characteristic, and a correcting step of performing a correction on the image data to which the gradation conversion processing is performed.

Note that, the obtaining step may obtain, together with the image data, information indicating by which mode the image data is generated between a first photographing mode not performing the correction on a dark part gradation of the image data and a second photographing mode performing the correction on the dark part gradation of the image data, a decision step may decide a first input-output characteristic to be the input-output characteristic when the image data is generated in the first photographing mode and decide a second input-output characteristic to be the input-output characteristic which includes a characteristic achieving, for a same input level, an output level lower than the first input-output characteristic and includes a characteristic changing contrast when the image data is generated in the second photographing mode, and further the correcting step may perform the correction to improve a lightness in the dark part gradation of the image data to which the gradation conversion processing is performed according to the second input-output characteristic in the gradation conversion processing step when the image data is generated in the second photographing mode.

Further, the characteristic changing the contrast in the second input-output characteristic may include a characteristic reducing the contrast in a middle part of a gradation.

In addition, the second input-output characteristic may be defined either by a gradation curve which has the characteristic achieving, for the same input level, a lower output level than the first input-output characteristic and a gradation curve which has the characteristic changing the contrast, or by a single gradation curve which has the characteristic achieving, for the same input level, a lower output level than the first input-output characteristic and which also has the characteristic changing the contrast.

Furthermore, the image processing program of the present invention may include a decision step deciding a lightness improvement amount in the dark part gradation by the correcting step according to the second input-output characteristic, and the correcting step may correct the dark part gradation of the image data according to the lightness improvement amount.

Moreover, the decision step may obtain an adjustment degree of a local contrast representing a contrast in a local region of an image according to the characteristic changing the contrast in the second input-output characteristic, and may decide the lightness improvement amount according to the adjustment degree being obtained.

Further, the decision step may decide, in association with each other, the input-output characteristic and an enhancement degree in performing the correction which enhances a local contrast representing a contrast in a local region of an image, and the correcting step may perform the correction which enhances the local contrast based on the enhancement degree for the image data to which the gradation conversion processing is performed.

Moreover, the input-output characteristic may include a characteristic in which a characteristic reducing the contrast is added in a middle part of a gradation.

In addition, the input-output characteristic may be defined either by a gradation curve which has a normal characteristic and a gradation curve which has the characteristic reducing the contrast, or by a single gradation curve in which the characteristic reducing the contrast is added to the normal characteristic.

Further, the decision step may decide the enhancement degree so as to become larger as a degree of reducing the contrast is larger, and may decide the enhancement degree so as to become smaller as the degree of reducing the contrast is smaller.

Another image processing program of the present invention realizing image processing on image date to be processed by a computer, which the program realizes an obtaining step obtaining the image data, a decision step deciding, in association with each other, an input-output characteristic to be used for gradation conversion processing and an enhancement degree in performing a correction which enhances a local contrast representing a contrast in a local region of an image, a gradation conversion processing step performing the gradation conversion processing on the image data according to the input-output characteristic, and a correcting step performing the correction which enhances the local contrast based on the enhancement degree on the image data to which the gradation conversion processing is performed.

An image processing apparatus of the present invention includes an obtaining unit obtaining image data to be processed, a decision unit deciding, in association with each other, an input-output characteristic to be used for gradation conversion processing and an enhancement degree in performing a correction which enhances local contrast representing a contrast in a local region of an image, a gradation conversion processing unit performing the gradation conversion processing on the image data according to the input-output characteristic, and a correcting unit performing the correction which enhances the local contrast based on the enhancement degree on the image data to which the gradation conversion processing is performed.

An image processing method of the present invention includes an obtaining process obtaining image data to be processed, a decision process deciding, in association with each other, an input-output characteristic to be used for gradation conversion processing and an enhancement degree in performing a correction which enhances a local contrast representing a contrast in a local region of an image, a gradation conversion processing process performing the gradation conversion processing on the image data according to the input-output characteristic, and a correcting process performing the correction which enhances the local contrast based on the enhancement degree on the image data to which the gradation conversion processing is performed.

DETAILED DESCRIPTION OF THE EMBODIMENTS

First Embodiment

Hereinafter, a first embodiment of the present invention will be explained by the use of the drawings. In the first embodiment, an example of a camera of the present invention will be explained by the use of a single reflex type electronic camera.

Figure 1:
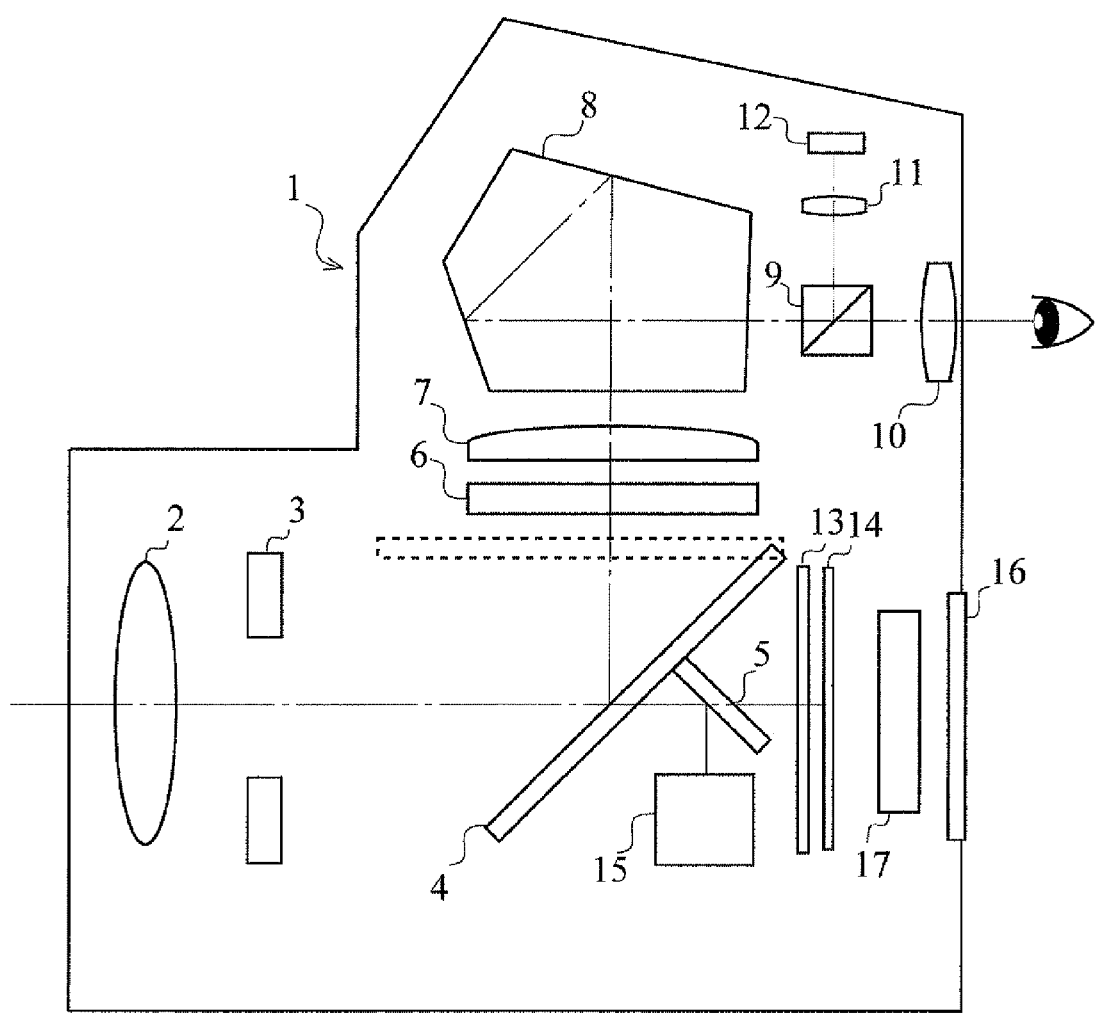
FIG. 1 is a diagram showing a configuration of an electronic camera 1 in a first embodiment.

FIG. 1 is a diagram showing a configuration of an electronic camera 1 in the first embodiment. As shown in FIG. 1, the electronic camera 1 is equipped with the following respective parts, which are a photographic lens 2, an aperture diaphragm 3, a quick return mirror 4, a sub mirror 5, a diffusing screen 6, a condenser lens 7, a pentaprism 8, a beam splitter 9, an eyepiece lens 10, a imaging lens 11, a photometry sensor 12, a shutter 13, an imaging sensor 14, and a focus detecting part 15.

The photometry sensor 12 is a photometry sensor having five divisions, for example. The imaging sensor 14 is a semiconductor device such as CCD (Charge Coupled Device) and CMOS (Complementary Metal Oxide Semiconductor), for example. The focus detecting part 15 performs focus detection by a phase difference method, for example, to detect a focusing state of the photographic lens 2. Further, the electronic camera 1 performs the focus detection by a contrast method according to brightness detected by the photometry sensor 12 to detect the focusing state of the photographic lens 2.

In addition, the electronic camera 1 is further equipped with a monitor 16 such as a liquid crystal monitor displaying an image generated by imaging or the like, and a control unit 17 controlling each part. The control unit 17 internally includes a memory which is not shown in the drawing and records a program for controlling each part.

At the time of non-photographing, that is, when photographing is not performed, the quick return mirror 4 is disposed at an angle of 45 degrees as shown in FIG. 1. Then, a light flux having passed through the photographic lens 2 and the aperture diaphragm 3 is reflected by the quick return mirror 4 and guided to the eyepiece lens 10 via the diffusing screen 6, the condenser lens 7, the pentaprism 8 and the beam splitter 9. A user performs the confirmation of composition by viewing an object image via the eyepiece lens 10. Meanwhile, a light flux split in the upper direction by the beam splitter 9 is re-imaged on an imaging plane of the photometric sensor 12 via the imaging lens 11. Further, the light flux having passed through the quick return mirror 4 is guided to the focus detecting part 15 via the sub mirror 5.

On the other hand, at the time of photographing, the quick return mirror 4 recedes to a position shown in a broken line and the shutter 13 is released, and then the light flux from the photographic lens 2 is guided to the imaging sensor 14.

Figure 2:
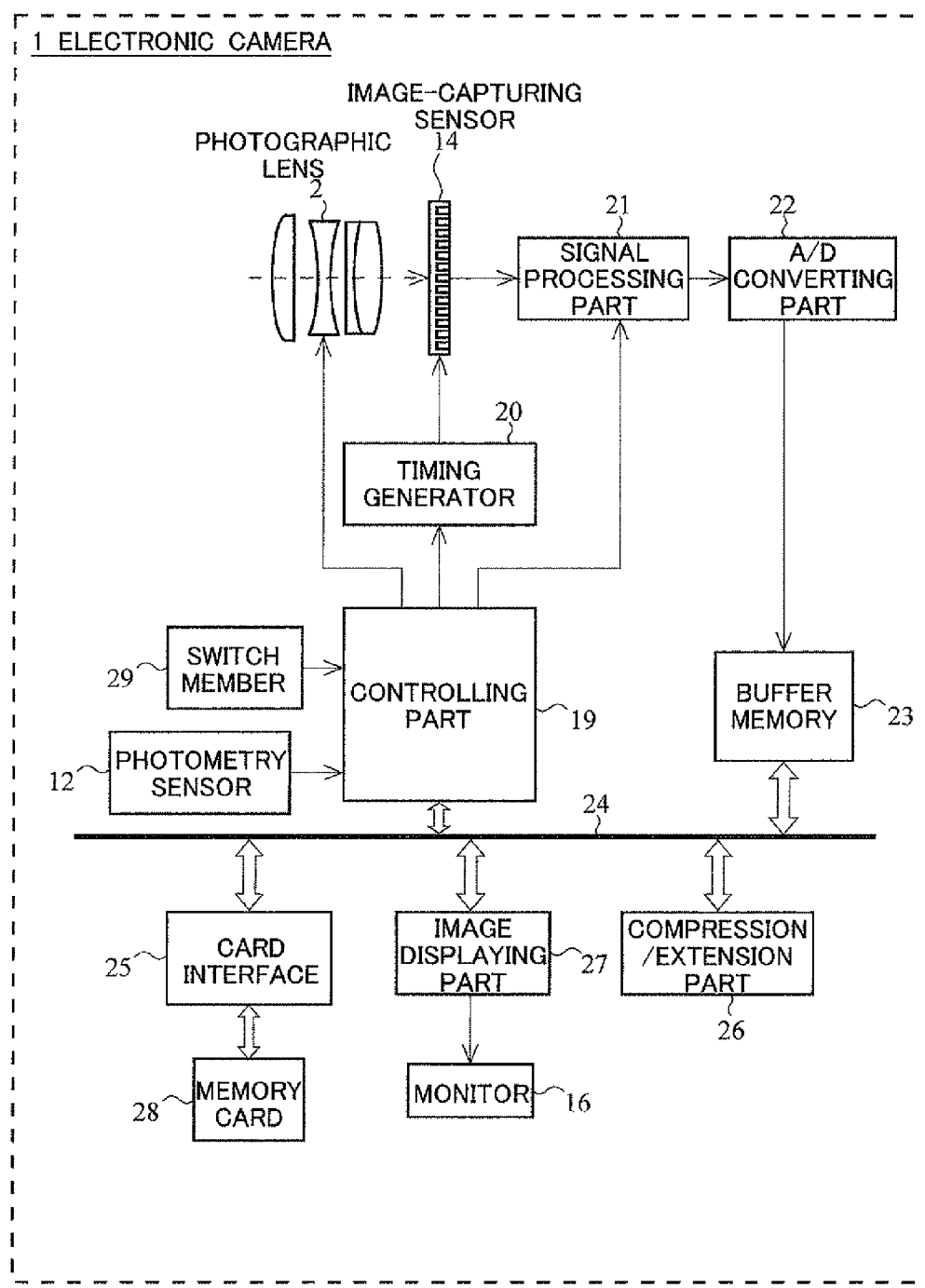
FIG. 2 is a functional block diagram of the electronic camera 1 in the first embodiment.

FIG. 2 is a functional block diagram of the electronic camera 1 of the first embodiment. As shown in FIG. 2, the electronic camera 1, in addition to the configuration of FIG. 1, is equipped with the following respective parts, which are a timing generator 20, a signal processing part 21, an A/D converting part 22, a buffer memory 23, a bus 24, a card interface 25, a compression/extension part 26, and an image displaying part 27. The timing generator 20 supplies an output pulse to the imaging sensor 14. Further, the image data generated by the imaging sensor 14 is temporarily stored in the buffer memory 23 via the signal processing part 21 (including a gain adjusting part corresponding to imaging sensitivity) and the A/D converting part 22. The buffer memory 23 is connected to the bus 24. This bus 24 is connected with the card interface 25, the controlling unit 17 explained in FIG. 1, the compression/extension part 26, and the image displaying part 27. The card interface 25 is connected with a detachable memory card 28 and records the image data into the memory card 28. In addition, the controlling unit 17 is connected with a switch group 29 of the electronic camera 1 (including a release button and the like which are not shown in the drawing), the timing generator 20 and the photometry sensor 12. Further, the image displaying part 27 displays an image and the like on the monitor 16 provided on the back plane of the electronic camera 1.

Further, the electronic camera 1 is equipped with a gradation non-compression mode without performing the correction of the dark part gradation in the image data and a gradation compression mode performing the correction of the dark part gradation. In which mode the photographing is to be carried out may be preliminarily selected by the user via the switch group 29 or may be automatically selected by the controlling unit 17.

Photographing operation of the electronic camera 1 configured as explained above will be explained by the use of a flowchart shown in FIG. 3.

In Step S1, the controlling unit 17 determines whether the instruction of photographing start has been provided by a user via the switch group 29. Then, when the controlling unit 17 determines that the instruction of the photographing start has been provided, the controlling unit 17 goes to Step S2.

In Step S2, the controlling unit 17 controls each part, and causes the imaging sensor 14 to capture an object image and generate image data. The image data generated in the imaging sensor 14 is temporarily stored in the buffer memory 23 via the signal processing part 21 and the A/D converting part 22.

In Step S3, the controlling unit 17 reads out the image data from the buffer memory 23 and performs normal image processing. The normal image processing includes white balance adjustment, interpolation processing, color correction processing, and the like. The specific method of each kind of the processing is the same as that of a publicly known technique and explanation will be omitted.

In Step S4, the controlling unit 17 determines whether the gradation compression mode is set or not. Then, the controlling unit 17 goes to Step S7 to be described hereinafter when the gradation compression mode is determined to be set. On the other hand, when the controlling unit 17 determines that the gradation compression mode is set (gradation non-compression mode is set), the controlling unit 17 goes to Step S5.

In Step S5, the controlling unit 17 selects a gradation curve G1. The gradation curve is used in gradation conversion processing which is to be performed in following Step S6. The controlling unit 17 preliminarily records three kinds of gradation curve (G1 to G3) shown in FIG. 4 and FIG. 5 in an internal memory which is not shown in the drawing.

Figure 4:
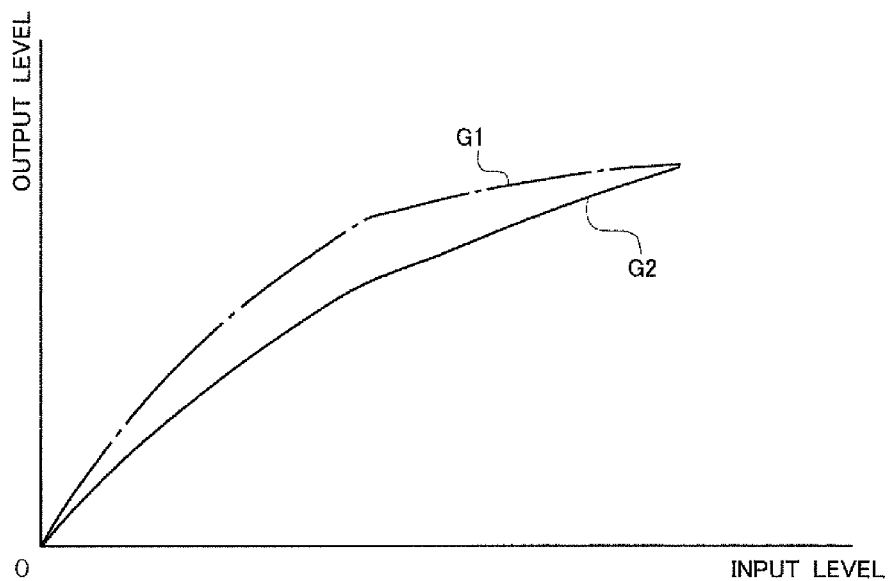
FIG. 4 is a diagram explaining a gradation curve.

In the gradation non-compression mode, the controlling unit 17 selects the gradation curve G1 shown in FIG. 4. The gradation curve G1 is a gradation curve used in normal gradation processing the same as that used in a publicly known technique.

In Step S6, the controlling unit 17 performs the gradation conversion processing for the image data subjected to the image processing in Step S3, according to the gradation curve G1 selected in Step S5. Details of the gradation conversion processing are the same as those of a publicly known technique and thus, the explanation will be omitted. Then, the controlling unit 17 goes to Step S12.

In Step S7, the controlling unit 17 selects the gradation curve G2. The gradation curve G2 has a characteristic realizing a low output level for the same level input when compared to the above gradation curve G1, as shown in FIG. 4. In more detail, the gradation curve G2 has a characteristic realizing a low output level for an input level in a dark part of a gradation when compared to the above gradation curve G1. Accordingly, the gradation curve G2 has a more gradual slope than the gradation curve G1 in the dark part of the gradation when compared to the above gradation curve G1. Further, the gradation curve G2 has a characteristic which enhances contrast in a bright part of the gradation more than the above gradation curve G1. Accordingly, the gradation curve G2 has a steeper slope than the gradation curve G1 in the bright part of the gradation when compared to the above gradation curve G1.

In Step S8, the controlling part 17 performs the gradation conversion processing for the image data subjected to the image processing in Step S3, according to the gradation curve G2 selected in Step S7. Details of the gradation conversion processing are the same as those of the publicly known technique and thus, the explanation will be omitted.

Figure 5:
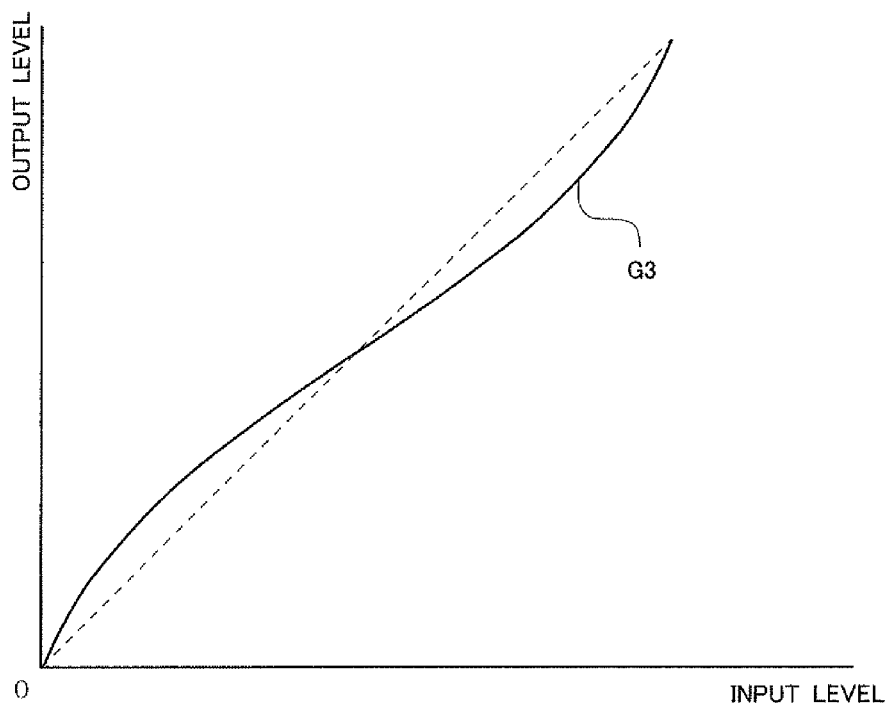
FIG. 5 is another diagram explaining a gradation curve.

In Step S9, the controlling unit 17 selects the gradation curve G3 shown in FIG. 5. The gradation curve G3 has a characteristic reducing the contrast in a middle part of the gradation when compared to a one-to-one input-output relationship (refer to a dotted line in FIG. 5) as shown in FIG. 5.

In Step S10, the controlling unit 17 performs the second gradation conversion processing for the image data subjected to the first gradation conversion processing in Step S8, according to the gradation curve G3 selected in Step S9. Details of the gradation conversion processing are the same as those of the publicly known technique and explanation will be omitted. Note that, by performing the gradation conversion processing according to the above gradation curve G3, the gradation is caused to become softer in the middle part of the gradation.

In Step S11, the controlling unit 17 performs the gradation compression processing for the image data subjected to the second gradation conversion processing in Step S10.

Figure 6:
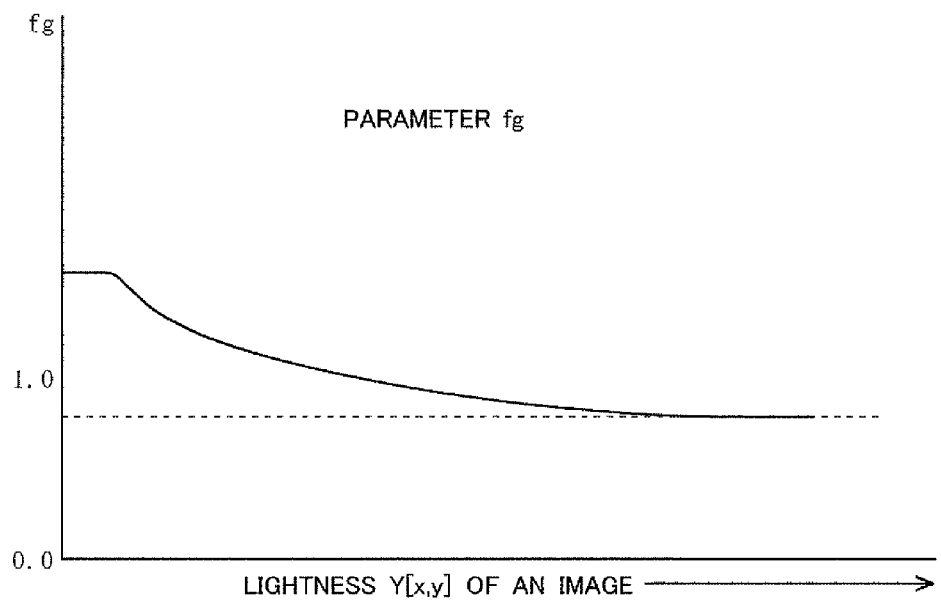
FIG. 6 is a diagram explaining a gradation compression parameter fg.

FIG. 6 is a diagram showing a gradation compression parameter fg. The parameter fg has a gain according to lightness Y of an image as shown in FIG. 6. Then, the parameter fg become larger as the smaller the lightness Y is smaller (as a periphery region including a pixel to be processed is darker). Adversely, the parameter fg comes closer to 1 as the lightness Y is larger (as the periphery region including the pixel to be processed is brighter).

Gradation compression calculation at each pixel R[x, y], G[x, y], and B[x, y] is performed in following Formula 1 to Formula 5.

$$Y[x, y] = kr \cdot R[x, y] + kg \cdot G[x, y] + kb \cdot B[x, y] \quad \text{[Formula 1]}$$

$$Y2[x, y] = ky \cdot Y[x, y] + \quad \text{[Formula 2]}$$
$$(1 - ky) \cdot \sum_{i=-d}^{d} \sum_{j=-d}^{d} \left( Y[x+i, y+j] \cdot Lpw\left((i^2 + j^2)^{1/2}\right) \right)$$

$$Rc[x, y] = R[x, y] \cdot fg(Y2[x, y]) \quad \text{[Formula 3]}$$

$$Gc[x, y] = G[x, y] \cdot fg(Y2[x, y]) \quad \text{[Formula 4]}$$

$$Bc[x, y] = B[x, y] \cdot fg(Y2[x, y]) \quad \text{[Formula 5]}$$

Figure 7:
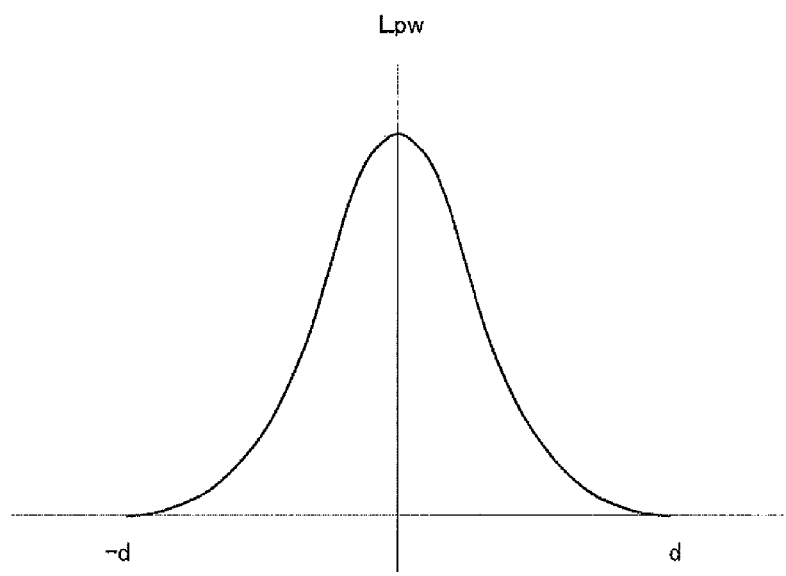
FIG. 7 is a diagram explaining a low pass filter.

Y in Formula 1 represents a brightness value of a pixel of interest. Then, kr, kg, kb, in Formula 1 are predetermined coefficients. Further, Lpw in Formula 2 is a low pass filter around the pixel of interest and this low pass filter has a characteristic shown in FIG. 7. Furthermore, ky in Formula 2 is a predetermined adjustment coefficient. Moreover, fg in Formula 3 to Formula 5 corresponds to the above parameter fg.

The adjustment coefficient ky is an adjustment coefficient for adjusting the contrast at a local region in an image (hereinafter, called "local contrast"). As apparent from Formula 2, the change of ky causes a weight to change in the combining of the brightness value of the pixel of interest and a low pass value around the pixel of interest. For example, when the adjustment coefficient ky is equal to one, only the brightness value of the pixel of interest decides an improvement amount of the parameter fg according to Formula 3 to Formula 5. Adversely, when the adjustment coefficient ky is equal to zero, only the low pass value around the pixel of interest decides the improvement amount of the parameter fg according to Formula 3 to Formula 5. The local contrast tends to be reduced as the adjustment coefficient ky becomes larger, and the local contrast tends to be enhanced as the adjustment coefficient becomes smaller. As explained in Step S10, while the gradation is caused to become softer by performing the gradation conversion processing according to the gradation curve G3, it is possible to maintain the apparent contrast by setting appropriately the adjustment coefficient ky to adjust the local contrast. The adjustment coefficient ky may be a fixed value or may be a variable value. Here, the adjustment coefficient ky is assumed to be a fixed value of approximately 0.5, for example.

Figure 8:
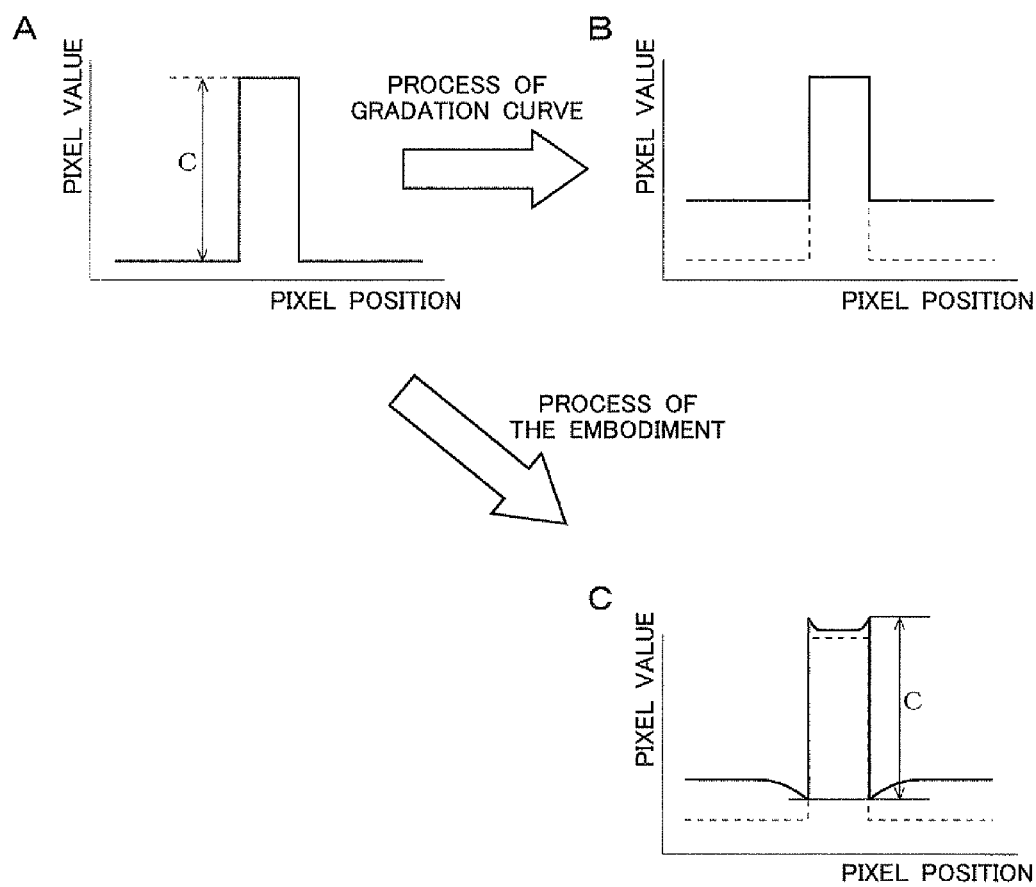
FIG. 8 is a diagram explaining a relationship between a local contrast and gradation compression processing.

Here, a relationship between the local contrast and the gradation compression processing will be explained with reference to FIG. 8. FIG. 8 is an exemplary diagram showing the behavior of the brightness value in the periphery of a certain pixel of interest. As shown in FIG. 8, when an original image A is subjected to processing of picking up a dark part by the gradation curve for an original image A, the contrast is reduced while dark flattening of the dark part gradation of an image B after the processing can be improved.

Meanwhile, as described above, by enhancing the local contrast by the adjustment coefficient in performing the gradation compression processing for the original image A, it is possible to enhance (maintain) the apparent contrast, while improving the dark flattening of the dark part gradation of an image C after the processing (refer to the arrow in FIG. 8). Such an effect can be obtained because the human visual perception senses the contrast locally.

In Step S12, the controlling unit 17 records the image data subjected to the gradation compression processing in Step S11 or the image data subjected to the gradation conversion processing in Step S6 into the memory card 28 via the card interface 25, and completes the series of processing. Note that the image data may be subjected to image compression processing (JPEG compression processing or the like) as needed via the compression/extension part 26 before recorded into the memory card 28.

As explained above, the first embodiment has the selectable first photographing mode without performing the correction of the dark gradation of the mage data and the selectable second photographing mode performing the correction of the dark gradation, and performs the gradation conversion processing according to the first input-output characteristic when the first photographing mode has been selected and performs the gradation conversion processing according to the second input-output characteristic which has a characteristic realizing a lower output level than the first input-output characteristic for the same level input and which also has a characteristic changing the contrast, when the second photographing mode has been selected. Then, when the second photographing mode has been selected, the first embodiment performs the correction to improve the lightness of the dark gradation in the image data subjected to the gradation conversion processing according to the second input-output characteristic by the gradation conversion processing part. Accordingly, it is possible to perform the gradation conversion processing and the correction of the dark part gradation which are capable of improving the bright part gradation and the dark part gradation while maintaining the apparent contrast in a region of interest. Further, the first embodiment can alleviate a phenomenon that a hue is changed by the gradation conversion processing using the conventional S-shaped gradation curve.

Further, in the first embodiment, the characteristic changing the contrast has a characteristic reducing the contrast in the middle part of the gradation. Accordingly, it is possible to suppress the result of the gradation conversion processing to a dark side and to maintain the brightness of the whole image at the same level before and after the gradation compression processing.

Further, the first embodiment obtains the adjustment degree of the local contrast representing the contrast in a local region of an image according to the characteristic changing the contrast in the second output characteristic and decides the lightness improvement amount according to the obtained adjustment degree. Accordingly, even if the gradation is caused to be softer by the gradation conversion processing, the dark part gradation can be corrected such that the apparent contrast is maintained at the same level in a region of interest.

Figure 3:
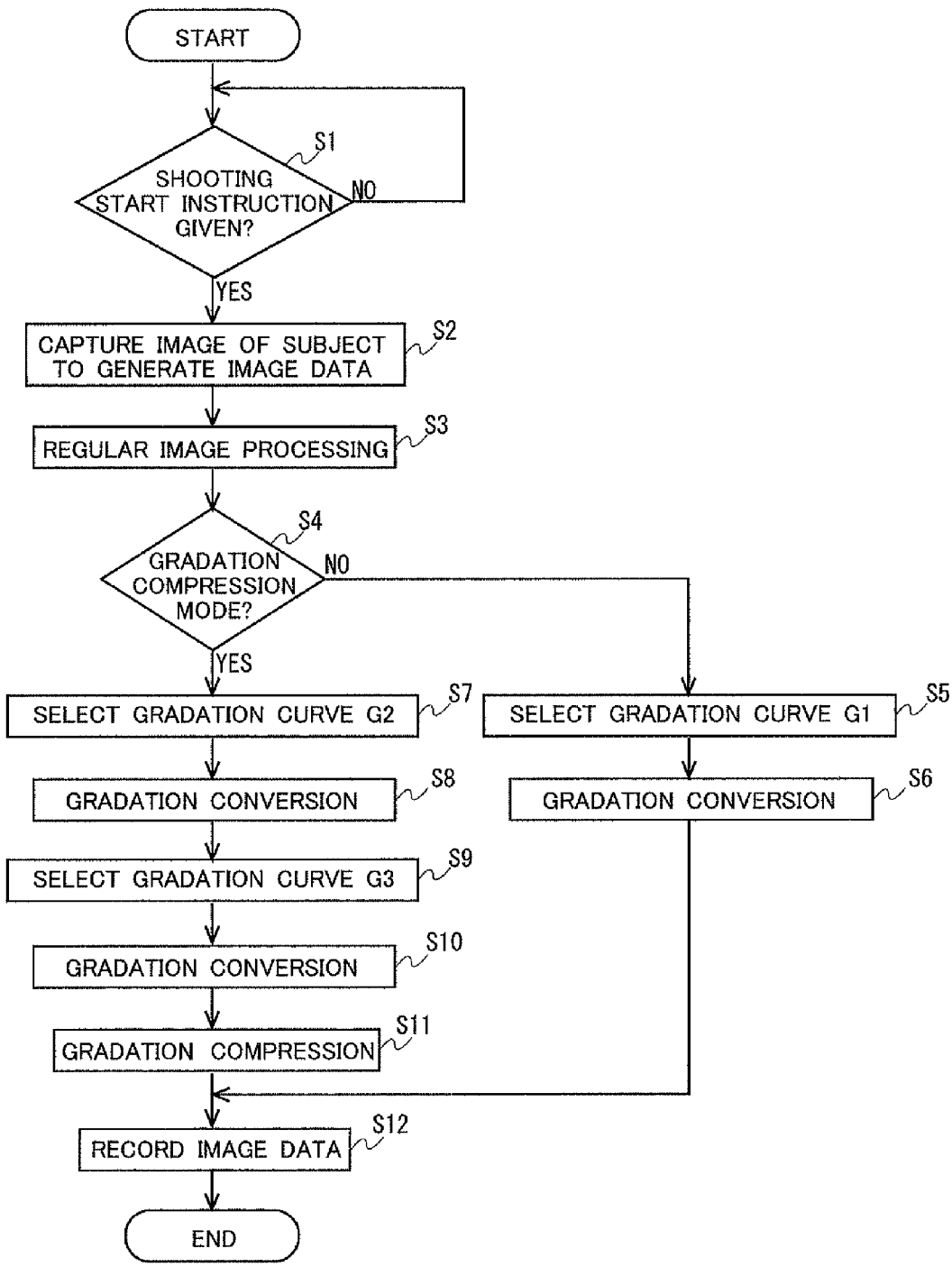
FIG. 3 is a flowchart showing photographing operation in the electronic camera 1 of the first embodiment.
Figure 9:
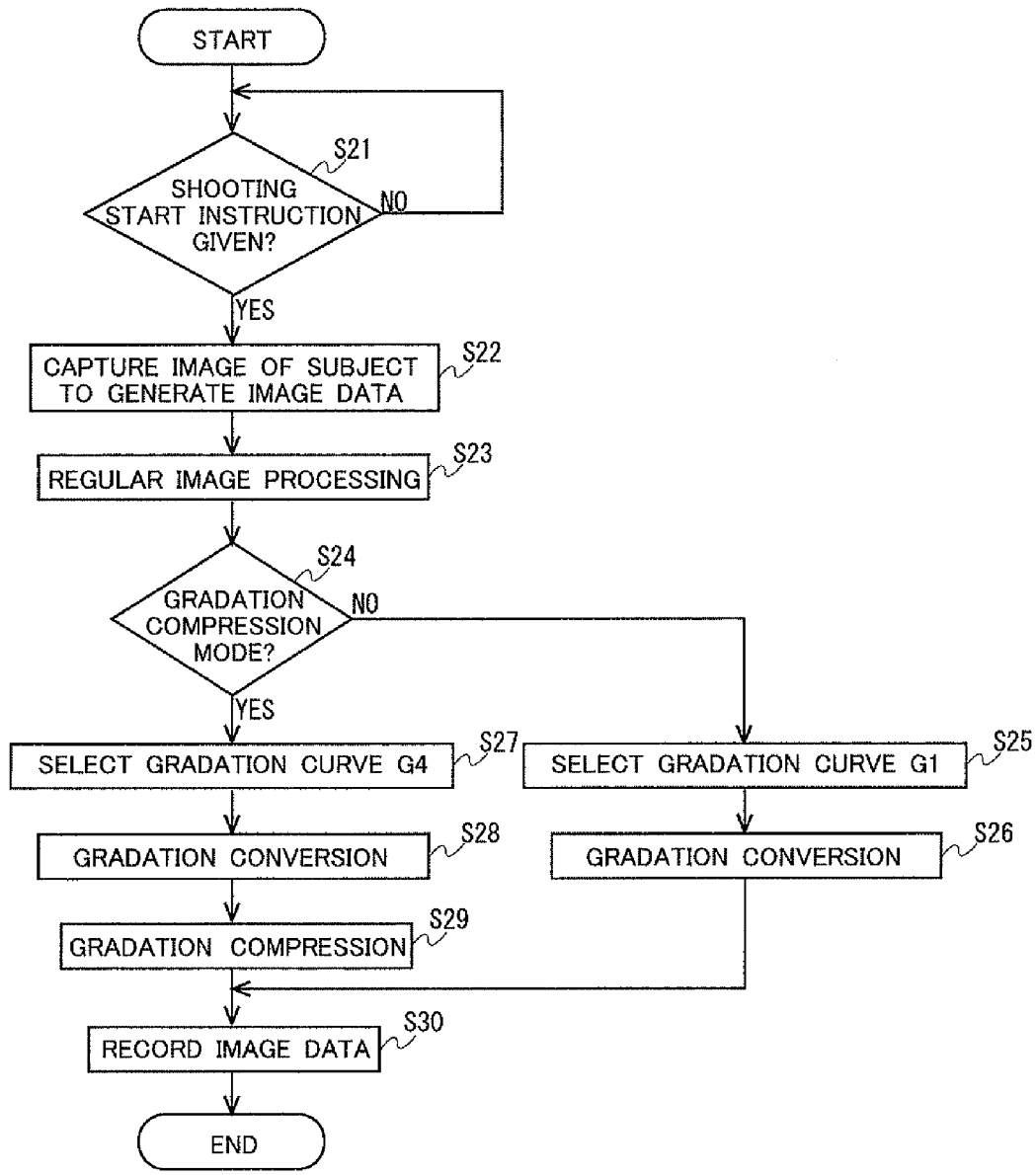
FIG. 9 is another flowchart showing photographing operation in the electronic camera 1 of the first embodiment.

Note that, while, in the first embodiment, an example is explained for the case where the gradation conversion processing is performed twice using the gradation curve G2 and the gradation curve G3, as explained by the use of the flowchart of FIG. 3, the gradation conversion processing may be configured to be performed only once by using a single gradation curve which has the characteristic realizing a lower output level than G1 for the same level input and also has the characteristic changing the contrast. That is, as shown in a flowchart of FIG. 9, the controlling unit 17 performs the same processing in Step S21 to Step S26 as that in Step S1 to Step S6 in the flowchart of FIG. 3.

Figure 10:
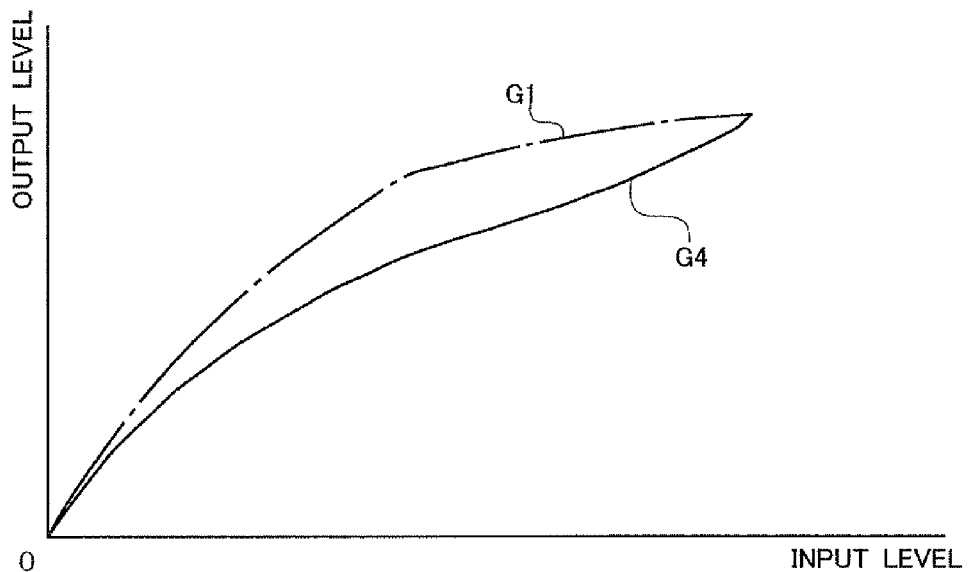
FIG. 10 is another diagram explaining a gradation curve.

Then, in Step S27, the controlling unit 17 selects a gradation curve G4. The gradation curve G4 is a gradation curve having both the characteristic of the gradation curve G2 and the characteristic of the gradation curve G3 explained by the use of the flowchart of FIG. 3, as shown in FIG. 10.

In Step S28, the controlling unit 17 performs the gradation conversion processing for the image data subjected to the image processing in Step S23, according to the gradation curve G4 selected in Step S27.

In Step S29 and Step S30, the controlling unit 17 performs the same processing as that in Step S11 and Step S12 of the flowchart of FIG. 3. By such a configuration, it is possible to obtain the same effect as that of the first embodiment.

Figure 11:
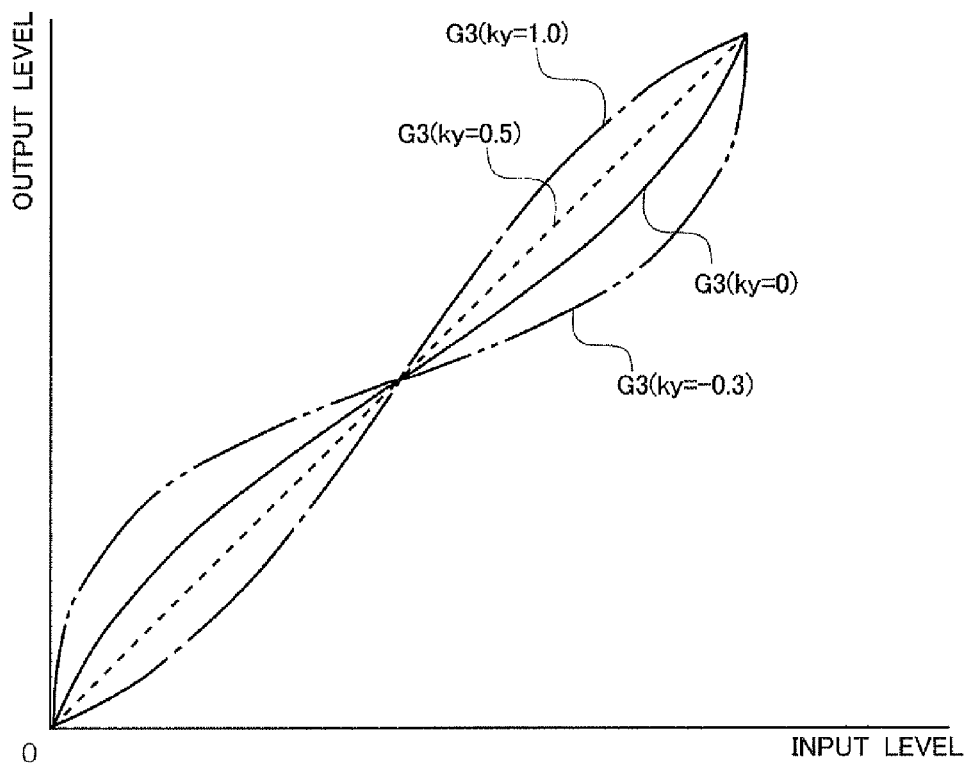
FIG. 11 is another diagram explaining a gradation curve.

Further, while, in the first embodiment, an example is explained for the case in which the gradation curve G3, which is a gradation curve to be used for the gradation conversion processing in the gradation compression mode, and the local contrast adjustment coefficient ky are fixed, the gradation curve G3 and the adjustment coefficient ky may be configured to be changed in conjunction with each other. As described above, the local contrast is reduced as the adjustment coefficient ky becomes larger, and the local contrast is enhanced as the adjustment coefficient ky becomes smaller. Accordingly, the gradation curve G3 may be set so as to strengthen the contrast in the middle part of the gradation as the adjustment coefficient ky becomes larger and the gradation curve G3 may be set so as to weaken the contrast in the middle part of the gradation as the adjustment coefficient ky becomes smaller. FIG. 11 shows an example of the gradation curve G3 when the adjustment coefficient ky is changed.

Note that the gradation curve G3 and the adjustment coefficient ky may be configured to be changed depending on a photographing mode (e.g., "portrait mode", "landscape mode" or the like), and may be configured to be changed according to a contrast strength of an image, or may be configured to be changed depending on an image adjustment mode. Further, the gradation curve G3 and the adjustment coefficient ky may be configured to be changed according to an image determination result by scene analysis or face recognition. By changing appropriately the gradation curve G3 and the adjustment coefficient ky in this manner, it is possible to perform the gradation conversion processing and the correction of the dark part gradation which are optimized for an image.

Further, for the plural gradation curves as shown in FIG. 11, any gradation curve may be selected for the use from preliminarily recorded curves, or the controlling unit 17 may be configured to adjust the gradation curve optionally for the use.

Further, the first embodiment may be configured to change the gradation curve used for the gradation conversion processing according to an influence of exposure correction. For example, when the exposure correction can realize that the brightness of the whole image is maintained to some extent, the change amount of the gradation curve used in the gradation compression mode may be determined to be smaller.

Further, the image processing apparatus explained in the first embodiment may be realized in a software manner by a computer and an image processing program. In this case, a part of or the whole of the processing in Step S4 and succeeding Steps explained in the flowchart of FIG. 3 may be configured to be realized by the computer. Alternatively, a part of or the whole of the processing in Step S24 and succeeding Steps explained in the flowchart of FIG. 9 may be configured to be realized by the computer. For the realization by the computer, information on whether the mode is the gradation compression mode or not may be supplied to the computer together with the image data. Such information can be supplied by the utilization of the EFIX information of the image data. By such a configuration, it becomes possible to perform the same processing as that in the first embodiment.

Second Embodiment

Hereinafter, a second embodiment of the present invention will be explained by the use of the drawing. In the second embodiment, an example will be explained for a single reflex type electronic camera to which an image processing program of the present invention is applied.

A configuration of the electronic camera in the second embodiment is the same as that of the electronic camera 1 in the first embodiment. Accordingly, explanation hereinafter will be made by the use of the same symbol as that of the first embodiment. Note that the electronic camera 1 of the second embodiment does not perform the gradation compression processing explained in the first embodiment, and is not provided with the gradation non-compression mode and the gradation compression mode.

The photographing operation of the electronic camera 1 of the second embodiment will be explained by the use of a flowchart shown in FIG. 12.

In Step S31, the controlling unit 17 determines whether the instruction of photographing start has been provided or not by a user via the switch group 29. Then, the controlling unit 17 goes to Step S32 when the instruction of the photographing start is determined to have been provided.

In Step S32, the controlling unit 17 controls each part, causes the imaging sensor 14 to capture an object image, and generates image data. The image data generated by the imaging sensor 14 is temporarily stored in the buffer memory 23 via the signal processing part 21 and the A/D converting part 22.

In Step S33, the controlling unit 17 reads out the image data from the buffer memory 23 and performs the normal image processing. The normal image processing includes white balance adjustment, interpolation processing, color correction processing, and the like. The specific method of each kind of the processing is the same as that of the publicly known technique and thus, the explanation will be omitted.

Figure 13:
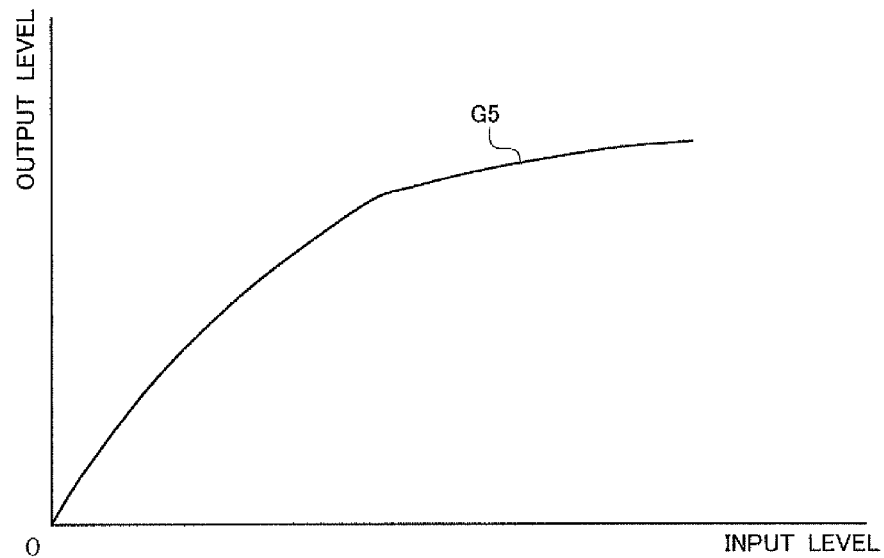
FIG. 13 is a diagram explaining a gradation curve.

In Step S34, the controlling unit 17 selects a gradation curve G5. The gradation curve G5 is used in the gradation conversion processing to be performed in Step S35 described hereinafter, and is a gradation curve in which the publicly known S-shaped characteristic is imparted to a gradation curve corresponding to an output device such as a CRT. The controlling unit 17 preliminarily records two kinds of gradation curve (G5 and G6) shown in FIG. 13 and FIG. 14, respectively, in the internal memory which is not shown in the drawing.

In Step S35, the controlling unit 17 performs the gradation conversion processing for the image data subjected to the image processing in Step S33, according to the gradation curve selected in Step S34. Details of the gradation conversion processing are the same as those of the publicly known technique and thus, the explanation will be omitted.

Figure 14:
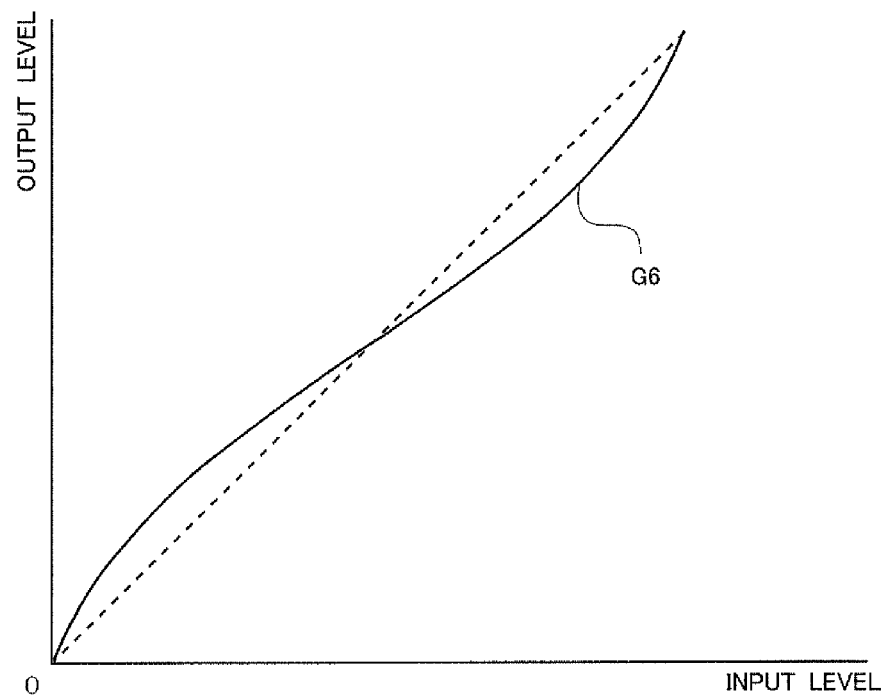
FIG. 14 is another diagram explaining a gradation curve.

In Step S36, the controlling unit 17 select the gradation curve G6. The gradation curve G6 has a characteristic weakening the contrast in the middle part of the gradation as shown in FIG. 14, compared to a one-to-one input-output relationship (refer to a dotted line in FIG. 14).

In Step S37, the controlling unit 17 performs the second gradation conversion processing for the image data subjected to the first gradation conversion processing in Step S35, according to the gradation curve G6 selected in Step S36. Details of the gradation conversion processing are the same as those of the publicly known technique and thus, the explanation will be omitted. Note that the gradation is caused to become softer in the middle part of the gradation by the gradation conversion processing according to the above gradation curve G6.

In Step S38, the controlling unit 17 performs local contrast enhancement processing for the image data subjected to the second gradation conversion processing in Step S37. The local contrast is the contrast in a local region of an image.

The calculation of the local contrast enhancement at each pixel R[x, y], G[x, y], and B[x, y] is performed by following Formula 6 to Formula 11.

$$Y[x, y] = kr \cdot R[x, y] + kg \cdot G[x, y] + kb \cdot B[x, y] \quad \text{[Formula 6]}$$

$$Ylp[x, y] = \sum_{i=-d}^{d} \sum_{j=-d}^{d} \left(Y[x+i, y+j] \cdot Lpw\left((i^2+j^2)^{1/2}\right)\right) \quad \text{[Formula 7]}$$

$$\text{gain}[x, y] = \frac{Y[x, y] + Kdif \cdot (Y[x, y] - Ylp[x, y])}{Y[x, y]} \quad \text{[Formula 8]}$$

$$Rc[x, y] = \text{gain}[x, y] \cdot R[x, y] \quad \text{[Formula 9]}$$

$$Gc[x, y] = \text{gain}[x, y] \cdot G[x, y] \quad \text{[Formula 10]}$$

$$Bc[x, y] = \text{gain}[x, y] \cdot B[x, y] \quad \text{[Formula 11]}$$

Figure 15:
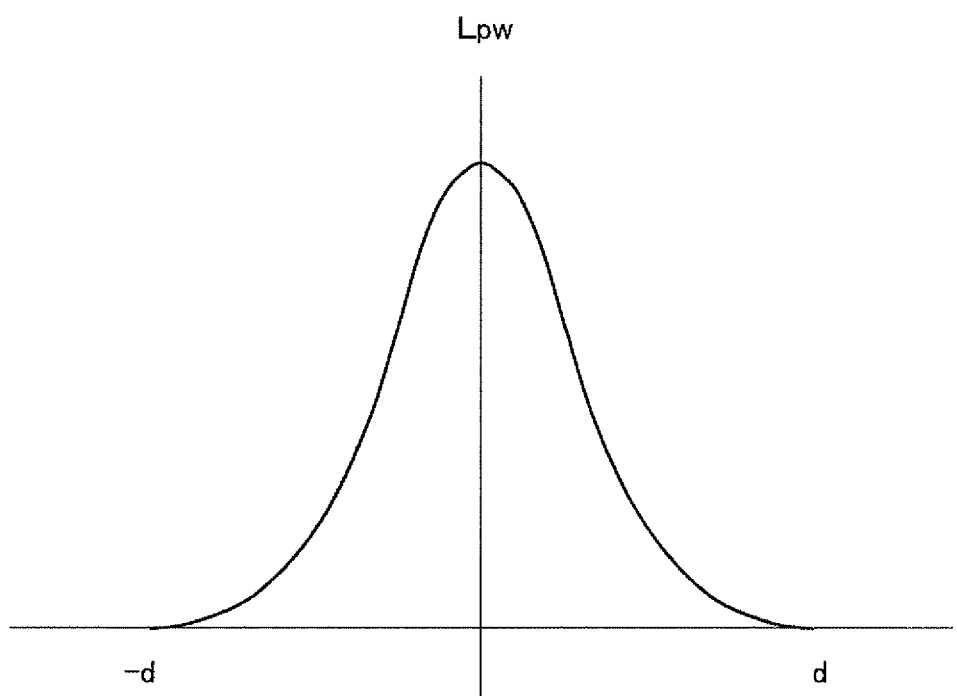
FIG. 15 is a diagram explaining a low pass filter.

Y in Formula 6 represents a brightness value of a pixel of interest. In addition, kr, kg, and kb are predetermined coefficients. Further, Lpw in Formula 7 is a low pass filter around the pixel of interest, and this low pass filter has a characteristic shown in FIG. 15. This low pass filter is a wide filter having a half bandwidth (d in FIG. 15) wider than one hundredth of a short side of an image. Accordingly, Ylp in Formula 7 corresponds to a low pass value obtained by subjecting the brightness value Y to the low pass processing. Moreover, gain in Formula 8 is a gain in the enhancement calculation and Kdif in Formula 8 is a predetermined adjustment coefficient.

The adjustment coefficient Kdif is a coefficient for adjusting the local contrast. As apparent from Formula 8, the change of the adjustment coefficient Kdif causes a weight to change in the combining of the brightness value of the pixel of interest and the low pass value around the pixel of interest. For example, when the adjustment coefficient Kdif is equal to zero, the local contrast is not enhanced as apparent from Formula 8. The enhancement degree of the local contrast tends to become larger as the adjustment coefficient Kdif becomes larger. As explained in Step S37, while the gradation is caused to become softer by performing the gradation conversion processing according to the gradation curve G6, it is possible to maintain the apparent contrast by setting appropriately the adjustment coefficient Kdif to adjust the local contrast. The adjustment coefficient Kdif may be a fixed value or variable value. Here, the adjustment coefficient Kdif is assumed to be a fixed value of approximately 0.1, for example.

In Step S39, the controlling unit 17 records the image data subjected to the local contrast enhancement processing in Step S38 into the memory card 28 via the card interface 25, and completes the series of processing. Note that the image data may be subjected to the image compression processing (PEG compression processing or the like) as needed via the compression/extension part 26 before being recorded into the memory card 28.

As explained above, the second embodiment performs the gradation conversion processing for the image data to be processed, according to the predetermined input-output characteristic, and performs the correction enhancing the local contrast for the image data subjected to the gradation conversion processing, according to the predetermined enhancement degree corresponding to the input characteristic. Accordingly, it is possible to improve the bright part gradation and the dark part gradation while maintaining the contrast. Further, the second embodiment can alleviate the phenomenon that respective hues in the bright part gradation, the middle part gradation and the dark part gradation are changed by the gradation conversion processing using the conventional S-shaped gradation curve.

Further, the second embodiment performs the correction which enhances the local contrast by using the low pass filter having a half bandwidth illustrated in FIG. 5 (d in FIG. 15) being one hundredth or more of a short side of an image, and thereby can perform the correction based on a medium frequency component. This correction is different from a correction based on a high frequency component such as edge enhancement normally performed for each pixel and can improve the bright part gradation and the dark pat gradation while maintaining the contrast by correcting the local contrast.

Third Embodiment

Hereinafter, a third embodiment of the present invention will be explained by the use of the drawing. The third embodiment is a variation example of the second embodiment and thus, only a different point from the second embodiment will be explained.

A configuration of an electronic camera of the third embodiment is the same as that of the electronic camera 1 in the second embodiment. Accordingly, explanation hereinafter will be made by the use of the same symbol as that of the second embodiment.

While, in the second embodiment, an example has been explained for the case where the gradation curve G6, which is a gradation curve to be used for the second gradation conversion processing, and the adjustment coefficient Kdif for adjusting the local contrast are fixed, the gradation curve G6 and the adjustment coefficient Kdif are changed in conjunction with each other in the third embodiment. As explained in the second embodiment, as the adjustment coefficient Kdif becomes larger, the enhancement degree of the adjustment coefficient becomes larger. Therefore, the controlling unit 17 may set the gradation curve G6 so that the contrast becomes weaker in the middle part of the gradation as the adjustment coefficient Kdif becomes larger.

Figure 16:
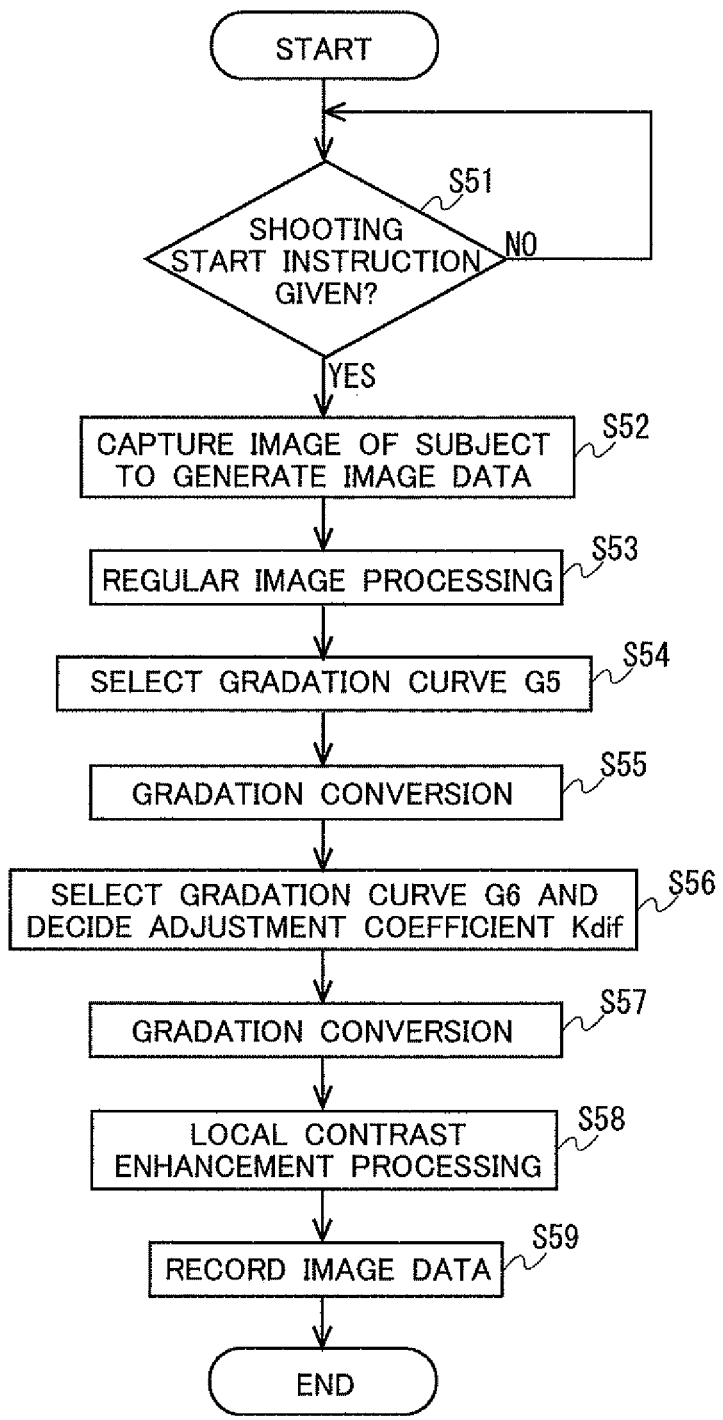
FIG. 16 is a flowchart showing photographing operation in an electronic camera 1 of a third embodiment.

A flowchart in FIG. 16 shows the photographing operation of an electronic camera 1 in the third embodiment.

Figure 12:
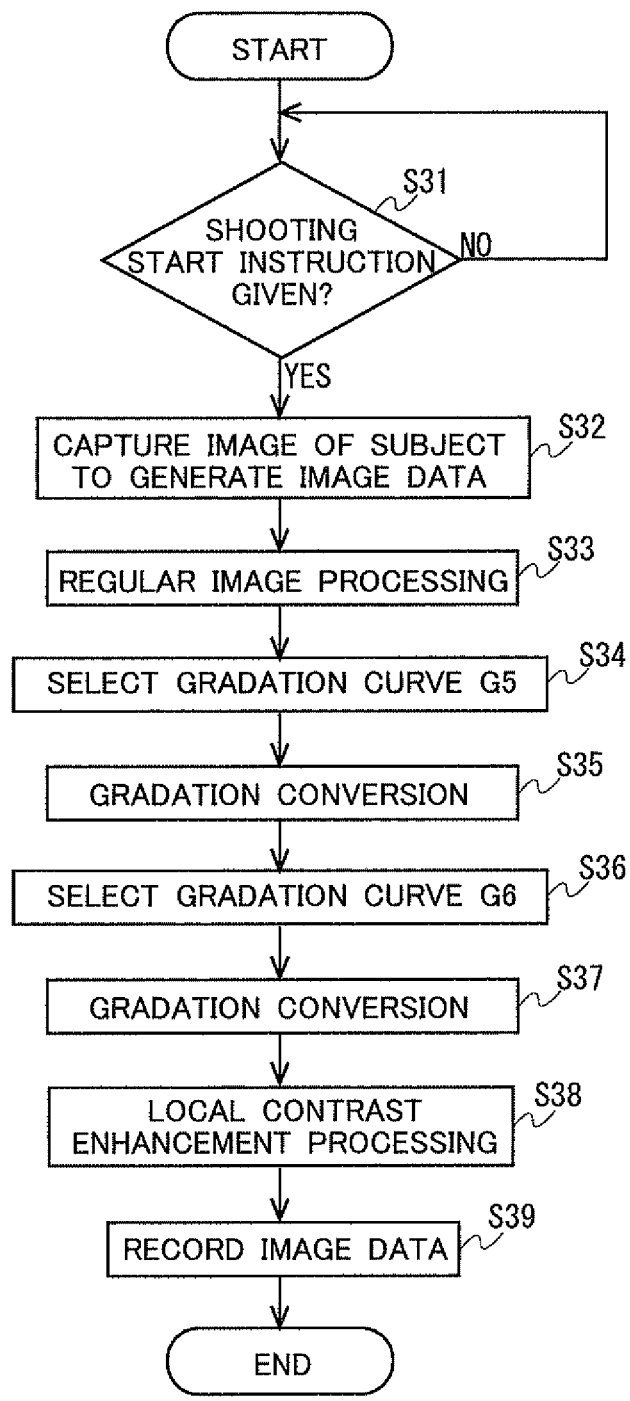
FIG. 12 is a flowchart showing photographing operation in an electronic camera 1 of a second embodiment.

In Step S51 to Step S55, the controlling unit 17 performs the same processing as that in Step S31 to Step S35 of the flowchart in FIG. 12.

Then, in Step S56, the controlling unit 17 selects the gradation curve G6 and decides the adjustment coefficient Kdif.

The controlling unit 17 may be configured to perform the selection of the gradation curve G6 and the decision of the adjustment coefficient Kdif, depending on the photographing mode (e.g., "portrait mode", "landscape mode", or the like), may be configured to perform these according to the contrast strength of an image, or may be configured to perform these, depending on the image adjustment mode. Further, the controlling unit 17 may be configured to perform the selection of the gradation curve G6 and the decision of the adjustment coefficient Kdif, according to an image determination result by scene analysis or face recognition. By performing appropriately the selection of the gradation curve G6 and the decision of the adjustment coefficient Kdif in this manner, it is possible to perform the gradation conversion processing and the enhancement processing of the local contrast, which are optimized for an image.

Figure 17:
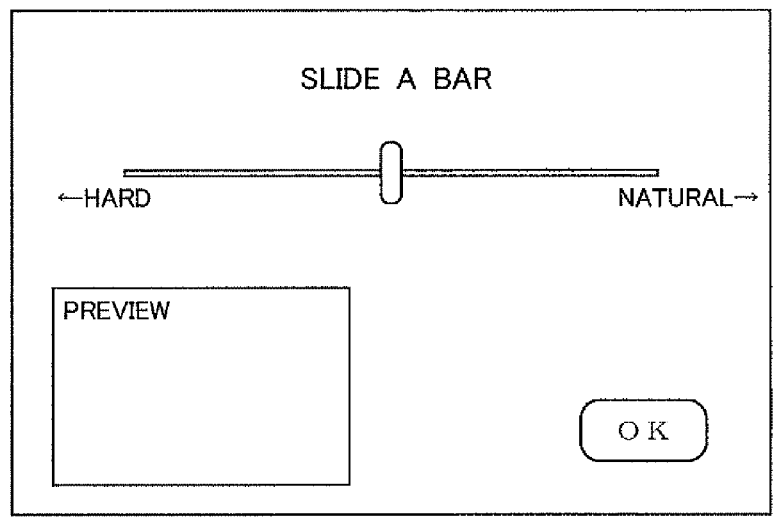
FIG. 17 is a diagram explaining the selection of a gradation curve G6 and the decision of an adjustment coefficient Kdif.

Further, the controlling unit 17 may perform the selection of the gradation curve G6 and the decision of the adjustment coefficient Kdif, according to user operation via the switch group 29. For example, the controlling unit 17 causes the image displaying part 27 to display a designation screen designating a characteristic at the time of the image processing as shown in FIG. 17. A user designates the characteristic at the time of the image processing by sliding a slide bar via the switch group 29. While an example shown in FIG. 17 makes use of a word "hard" or "natural", this is an example and any word may be used if the word represents the characteristic at the time of the image processing corresponding to the above gradation curve G6 and adjustment coefficient Kdif. Then, the controlling unit 17 decides the input-output characteristic to be used for the gradation conversion processing and the enhancement degree in performing the correction to enhance the local contrast representing the contrast in the local region of an image, in association with each other according to the characteristic of the image processing designated by the user. For example, the example of FIG. 17 decides the value of the adjustment coefficient Kdif so as to become larger as the characteristic designated by the user is closer to "natural, and decides the adjustment coefficient Kdif so as to become smaller as the characteristic designated by the user is closer to "hard". Further, the degree of the gradation softening by the gradation curve G6 is increased as the characteristic designated by the user is closer to "natural" and the degree of the gradation softening by the gradation curve G6 is reduced as the characteristic designated by the user is closer to "hard". Note that, when causing the user to designate the characteristic at the time of the image processing, the controlling unit 17 may be configured to provide a preview screen as illustrated in FIG. 17 and allow the user to confirm the result of the image processing according to the designated characteristic.

Figure 18:
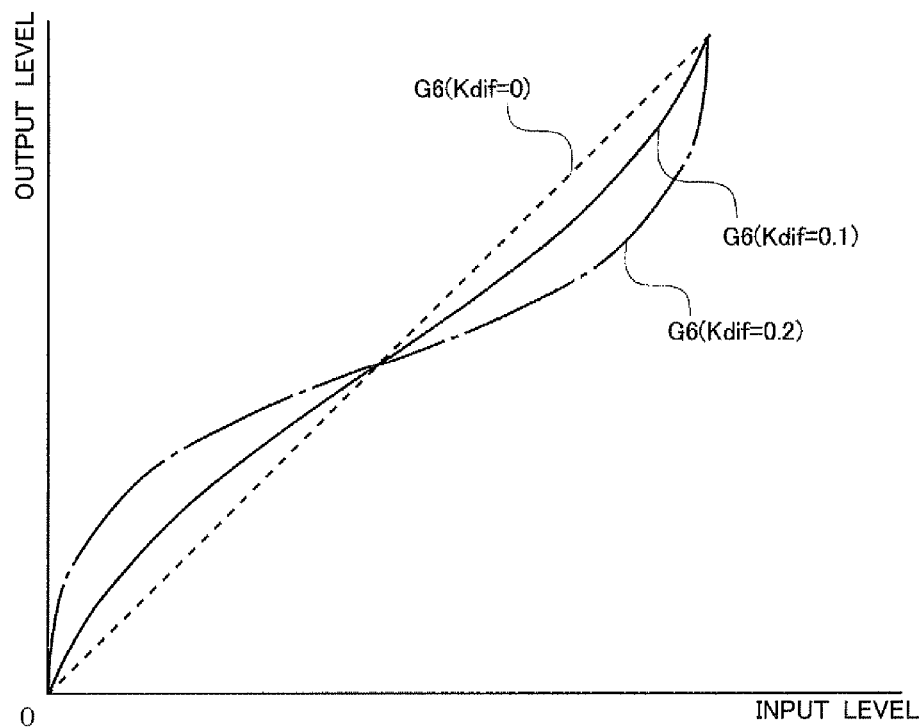
FIG. 18 is another diagram explaining a gradation curve.

FIG. 18 shows an example of a relationship between the gradation curve G6 and the adjustment coefficient Kdif. The controlling unit 17 may preliminarily record plural gradation curves as shown in FIG. 18 and select and use any of the gradation curves, or may be configured to adjust the gradation curve appropriately for the use.

In Step S57, the controlling unit 17 performs the second gradation conversion processing for the image data subjected to the first gradation conversion in Step S55, according to the gradation curve G6 selected in Step S56, in the same way as in Step 37 of the flowchart in FIG. 12.

In Step S58, the controlling unit 17 performs the local contrast enhancement processing for the image data subjected to the second gradation conversion processing in Step S57, according to the adjustment coefficient Kdif decided in Step S56, in the same way as in the Step S38 of the flowchart in FIG. 12.

In Step S59, the controlling unit 17 records the image data subjected to the local contrast enhancement processing in Step S58 into the memory card 28 via the card interface 25 in the same way as in Step S39 of the flowchart in FIG. 12 and completes the series of processing. Note that the image data may be subjected to the image compression processing PEG compression processing or the like) via the compression/extension part 26 as needed before recorded into the memory card 28.

As explained above, the third embodiment decides the input-output characteristic to be used for the gradation conversion processing and the enhancement degree in performing the correction enhancing the local contrast which represents the contrast in the local region of an image, in association with each other. Accordingly, in addition to the effect of the second embodiment, it is possible to decide most appropriate factors in a balanced manner for improving the bright part gradation and the dark part gradation while maintaining the apparent contrast. Such an effect can be obtained because the human visual perception senses the contrast locally.

Fourth Embodiment

Hereinafter, a fourth embodiment of the present invention will be explained by the use of the drawing. The fourth embodiment is a variation example of the second embodiment and only a different point from the second embodiment will be explained.

A configuration of an electronic camera of the fourth embodiment is the same as that of the electronic camera 1 in the second embodiment. Accordingly, explanation hereinafter will be made by the use of the same symbol as that in the second embodiment.

Figure 19:
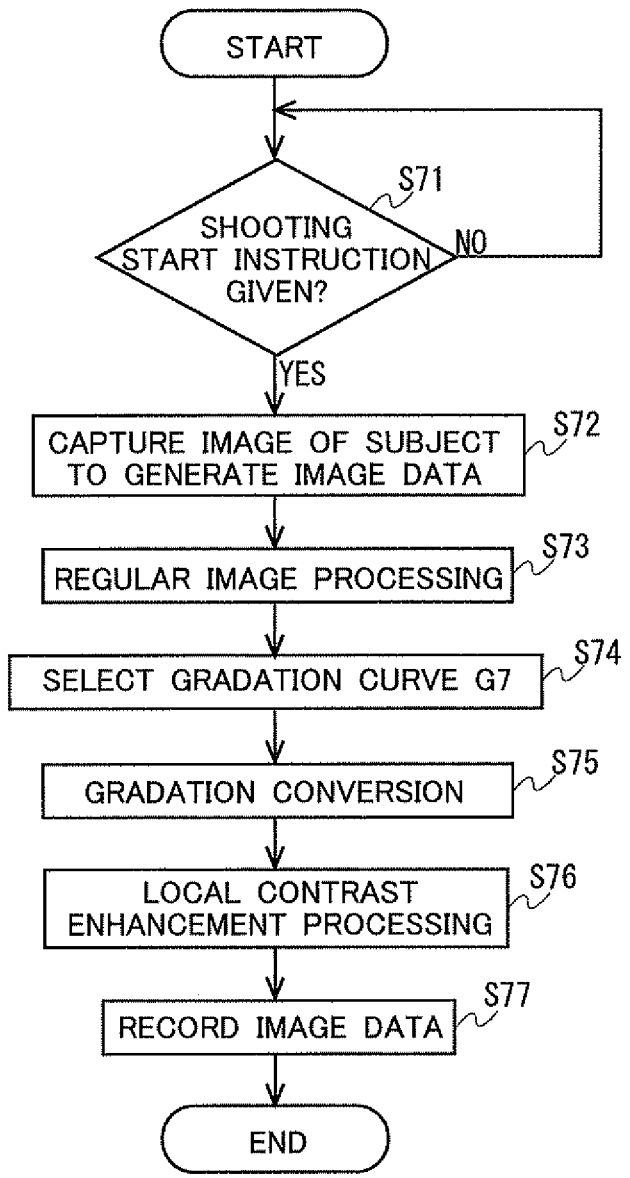
FIG. 19 is another flowchart showing photographing operation in an electronic camera 1 of a fourth embodiment.

A flowchart in FIG. 19 shows the photographing operation of the electronic camera 1 of the fourth embodiment.

In Step S71 to Step S73, the controlling unit 17 performs the same processing as that in Step S31 to Step S33 of the flowchart in FIG. 12.

Figure 20:
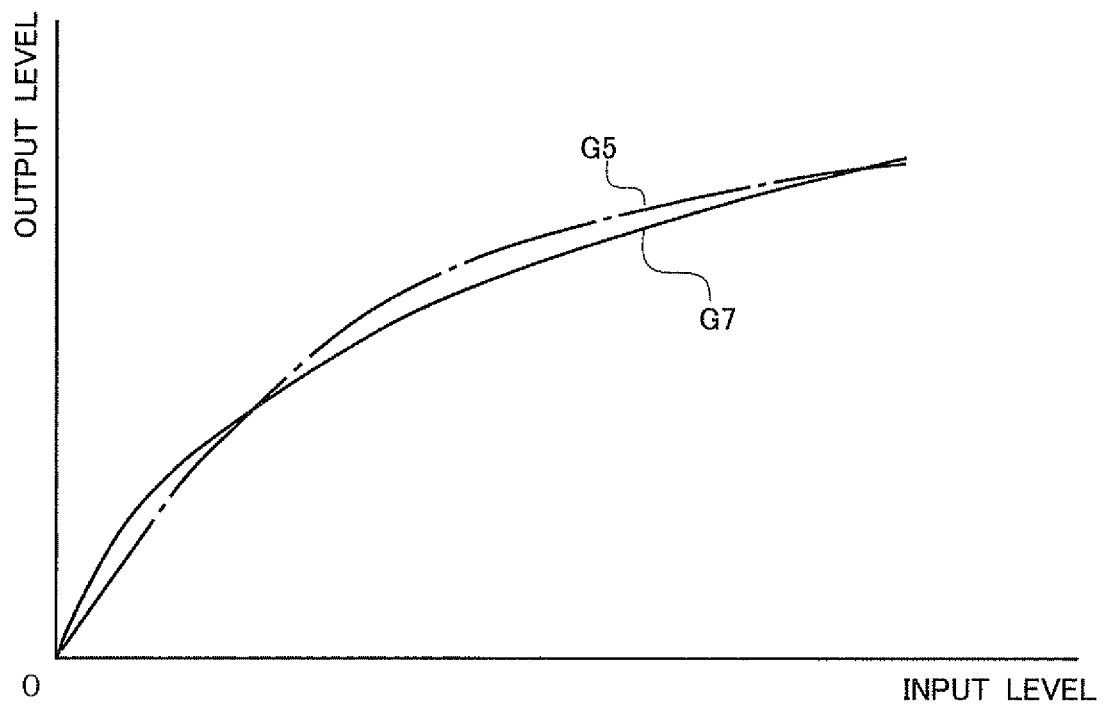
FIG. 20 is another diagram explaining a gradation curve.

Then, in Step S74, the controlling unit 17 selects a gradation curve G7. The gradation curve G7 is a gradation curve having both the characteristic of the gradation curve G5 and the characteristic of the gradation curve G6 which have been explained by the use of the flowchart in FIG. 12, as shown in FIG. 20.

In Step S75, the controlling unit 17 performs the gradation conversion processing for the image data subjected to the image processing in Step S73, according to the gradation curve G7 selected in Step S74. That is, the controlling unit 17 performs the first gradation conversion processing only once by using a single gradation curve in which a characteristic weakening the contrast (corresponding to G6) is added to the normal characteristic (corresponding to G5).

In Step S76 and Step S77, the controlling unit 17 performs the same processing as that in Step S38 and Step S39 in the flowchart of FIG. 12. By such a configuration, it is possible to obtain the same effect as that of the second embodiment.

Note that the image processing apparatus explained in the above second embodiment to fourth embodiment may be realized in a software manner by a computer and an image processing program. In this case, a part of or the whole of the processing in Step S34 and succeeding Steps explained in the flowchart of FIG. 12 may be configured to be realized by the computer. Alternatively, a part of or the whole of the processing of Step S54 and succeeding Steps explained in the flowchart of FIG. 16 may be configured to be realized by the computer. Further, a part of or the whole of the processing of Step S74 and succeeding Steps explained in the flowchart of FIG. 19 may be configured to be realized by the computer.

Further, the present invention can also be applied similarly to the case where the image to be processed is an image which has been subjected to the gradation conversion processing using the gradation curve G5 explained in the above second embodiment to fourth embodiment. In this case, a part of or the whole of the processing of Step S36 and succeeding Steps explained in the flowchart of FIG. 12 may be configured to be realized by the computer. Alternatively, a part of or the whole of the processing of Step S56 and succeeding Steps explained in the flowchart of FIG. 16 may be configured to be realized by the computer.

Moreover, in each of the above embodiments, an example has been explained for realizing the technique of the present invention in the electronic camera 1. However, the present invention is not limited to this example. For example, the present invention can be applied similarly to a compact type electronic camera, a movie camera photographing a moving image, and the like.

The many features and advantages of the embodiments are apparent from the detailed specification and, thus, it is intended by the appended claims to cover all such features and advantages of the embodiments that within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An imaging apparatus comprising:
    an imaging unit capturing an object image and generating image data;
    a selecting unit selecting either one of a first photographing mode not performing a correction on a dark part gradation of the image data and a second photographing mode performing the correction on the dark part gradation of the image data;
    a gradation conversion processing unit performing gradation conversion processing according to a first input-output characteristic when the first photographing mode is selected and performing the gradation conversion processing according to a second input-output characteristic when the second photographing mode is selected, the second input-output characteristic includes a characteristic achieving, for a same input level, an output level lower than the first input-output characteristic and includes a characteristic changing a contrast;
    a low-pass processing unit generating, when the second photographing mode is selected, a low-pass image by performing a low-pass filter on the image data to which the gradation conversion processing is performed according to the second input-output characteristic by the gradation conversion processing unit; and
    a correcting unit performing the correction, by using the low-pass image generated by the low-pass processing unit, to improve a lightness in the dark part gradation of the image data to which the gradation conversion processing is performed according to the second input-output characteristic by the gradation conversion processing unit.

2. The imaging apparatus according to claim 1, wherein the characteristic changing the contrast in the second input-output characteristic includes a characteristic reducing the contrast in a middle part of a gradation.

3. The imaging apparatus according to claim 1, wherein the second input-output characteristic is defined either by a gradation curve having the characteristic achieving, for the same input level, the output level lower than the first input-output characteristic and a gradation curve having the characteristic changing the contrast, or by a single gradation curve having the characteristic achieving, for the same input level, the output level lower than the first input-output characteristic and the characteristic changing the contrast.

4. The imaging apparatus according to claim 1, further comprising
    a decision unit deciding a lightness improvement amount in the dark part gradation by the correcting unit according to the second input-output characteristic, wherein
    the correcting unit corrects the dark part gradation of the image data according to the lightness improvement amount.

5. The imaging apparatus according to claim 4, wherein the decision unit obtains an adjustment degree of a local contrast representing a contrast in a local region of an image according to the characteristic changing the contrast in the second input-output characteristic, and decides the lightness improvement amount according to the adjustment degree being obtained.

6. A non-transitory storage medium storing an image processing program causing a computer to execute image processing on image data to be processed, the program causes the computer to execute:
    an obtaining step obtaining the image data;
    a decision step deciding an input-output characteristic to be used for gradation conversion processing;
    a gradation conversion processing step performing the gradation conversion processing on the image data according to the input-output characteristic;
    a low-pass image generating step generating a low-pass image by performing a low-pass filter on the image data to which the gradation conversion processing is performed according to the input-output characteristic; and
    a correcting step performing a correction, by using the low-pass image generated in the low-pass image generating step, on the image data to which the gradation conversion processing is performed.

7. The image processing program according to claim 6, wherein:
    the obtaining step obtains, together with the image data, information indicating by which mode the image data is generated between a first photographing mode not performing the correction on a dark part gradation of the image data and a second photographing mode performing the correction on the dark part gradation of the image data;

the decision step decides a first input-output characteristic to be the input-output characteristic when the image data is generated in the first photographing mode and decides a second input-output characteristic to be the input-output characteristic when the image data is generated in the second photographing mode, the second input-output characteristic includes a characteristic achieving, for a same input level, an output level lower than the first input-output characteristic and includes a characteristic changing a contrast; and the correcting step performs the correction to improve a lightness in the dark part gradation of the image data to which the gradation conversion processing is performed according to the second input-output characteristic in the gradation conversion processing step when the image data is generated in the second photographing mode.

8. The image processing program according to claim 7, wherein the characteristic changing the contrast in the second input-output characteristic includes a characteristic reducing the contrast in a middle part of a gradation.

9. The image processing program according to claim 8, wherein the second input-output characteristic is defined either by a gradation curve having the characteristic achieving, for the same input level, the output level lower than the first input-output characteristic and a gradation curve having the characteristic changing the contrast, or by a single gradation curve having the characteristic achieving, for the same input level, the output level lower than the first input-output characteristic and the characteristic changing the contrast.

10. The image processing program according to claim 7, further comprising a decision step deciding a lightness improvement amount in the dark part gradation by the correcting step according to the second input-output characteristic, wherein the correcting step corrects the dark part gradation of the image data according to the lightness improvement amount.

11. The image processing program according to claim 10, wherein the decision step obtains an adjustment degree of a local contrast representing a contrast in a local region of an image according to the characteristic changing the contrast in the second input-output characteristic, and decides the lightness improvement amount based on the adjustment degree being obtained.

12. The image processing program according to claim 6, wherein the decision step decides, in association with each other, the input-output characteristic and an enhancement degree in performing the correction which enhances a local contrast representing a contrast in a local region of an image, and the correcting step performs the correction enhancing the local contrast based on the enhancement degree for the image data to which the gradation conversion processing is performed.

13. The image processing program according to claim 12, wherein the input-output characteristic includes a characteristic in which a characteristic reducing the contrast is added in a middle part of a gradation.

14. The image processing program according to claim 13, wherein the input-output characteristic is defined either by a gradation curve having a normal characteristic and a gradation curve having the characteristic reducing the contrast, or by a single gradation curve in which the characteristic reducing the contrast is added to the normal characteristic.

15. The image processing program according to claim 13, wherein the decision step decides the enhancement degree so as to become larger as a degree of reducing the contrast is larger, and decides the enhancement degree so as to become smaller as the degree of reducing the contrast is smaller.

16. A non-transitory storage medium storing an image processing program causing a computer to execute image processing on image date to be processed, the program causes the computer to execute;

an obtaining step obtaining the image data;

a decision step deciding, in association with each other, an input-output characteristic to be used for gradation conversion processing and an enhancement degree in performing a correction which enhances a local contrast representing a contrast in a local region of an image;

a gradation conversion processing step performing the gradation conversion processing on the image data according to the input-output characteristic;

a low-pass image generating step generating a low-pass image by performing a low-pass filter on the image data to which the gradation conversion processing is performed according to the input-output characteristic; and a correcting step performing the correction, by using the low-pass image generated in the low-pass image generating step, which enhances the local contrast based on the enhancement degree on the image data to which the gradation conversion processing is processed.

17. An image processing apparatus, comprising:

an obtaining unit obtaining image data to be processed;

a decision unit deciding, in association with each other, an input-output characteristic to be used for gradation conversion processing and an enhancement degree in performing a correction which enhances a local contrast representing a contrast in a local region of an image;

a gradation conversion processing unit performing the gradation conversion processing on the image data according to the input-output characteristic;

a low-pass processing unit generating a low-pass image by performing a low-pass filter on the image data to which the gradation conversion processing is performed according to the input-output characteristic by the gradation conversion processing unit; and a correcting unit performing the correction, by using the low-pass image generated by the low-pass processing unit, which enhances the local contrast based on the enhancement degree on the image data to which the gradation conversion processing is processed.

18. An image processing method comprising:

an obtaining process obtaining image data to be processed;

a decision process deciding, in association with each other, an input-output characteristic to be used for gradation conversion processing and an enhancement degree in performing a correction which enhances a local contrast representing a contrast in a local region of an image;

a gradation conversion processing process performing the gradation conversion processing on the image data according to the input-output characteristic;
a low-pass image generating step generating a low-pass image by performing a low-pass filter on the image data to which the gradation conversion processing is performed according to the input-output characteristic; and
a correcting process performing the correction, by using the low-pass image generated in the low-pass image generating step, which enhances the local contrast based on the enhancement degree on the image data to which the gradation conversion processing is performed.

* * * * *